United States Patent
Manchanda et al.

(10) Patent No.: US 10,149,310 B1
(45) Date of Patent: Dec. 4, 2018

(54) DONOR SELECTION FOR RELAY ACCESS NODES

(71) Applicant: Sprint Spectrum LP, Overland Park, KS (US)

(72) Inventors: Nitesh Manchanda, Overland Park, KS (US); Jasinder Singh, Olathe, KS (US); Siddharth Oroskar, Overland Park, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 220 days.

(21) Appl. No.: 15/017,834

(22) Filed: Feb. 8, 2016

(51) Int. Cl.
*H04B 7/14* (2006.01)
*H04W 72/10* (2009.01)
*H04W 72/08* (2009.01)
*H04W 74/08* (2009.01)
*H04L 5/00* (2006.01)

(52) U.S. Cl.
CPC ........... *H04W 72/10* (2013.01); *H04L 5/0057* (2013.01); *H04W 72/085* (2013.01); *H04W 74/0875* (2013.01)

(58) Field of Classification Search
CPC . H04W 72/10; H04W 5/0057; H04W 72/085; H04W 74/0875
See application file for complete search history.

(56) References Cited

U.S. PATENT DOCUMENTS

| | | | |
|---|---|---|---|
| 8,848,658 B2 | 9/2014 | Gorokhov et al. | |
| 2005/0239464 A1* | 10/2005 | Iacono | H04B 7/0408 455/436 |
| 2009/0191866 A1* | 7/2009 | Flore | H04W 8/005 455/434 |
| 2010/0110963 A1* | 5/2010 | Huang | H04W 68/06 370/312 |
| 2013/0163508 A1 | 6/2013 | Yu et al. | |
| 2013/0279346 A1 | 10/2013 | Zhang | |
| 2016/0192261 A1* | 6/2016 | Wang | H04W 36/0055 370/331 |

* cited by examiner

*Primary Examiner* — Abdelnabi O Musa

(57) ABSTRACT

A relay wireless device is configured to function as a relay on behalf of a donor access node. The relay wireless device determines a preferred donor access node from among a plurality of candidate donor access nodes based on a measurement of a reference signal, such as an RSRP or SINR, associated with each access node within a range of the relay wireless device. The access nodes may be prioritized based on the measurement, as well as based on a maximum number of dedicated random access preambles provided by each access node, and a default paging cycle of each access node. The access node that has the highest priority based on a good RSRP/SINR, a high number of dedicated random access preambles, and a large paging cycle, is selected as the preferred donor access node, and a connection request submitted to the preferred donor access node.

19 Claims, 5 Drawing Sheets

DONOR SELECTION FOR RELAY ACCESS NODES

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or donor access node, and an end-user wireless device. Relay wireless devices may be used at the edge of a coverage area of a donor access node to improve coverage and/or service, as well as in crowded areas having a high number of other wireless devices to increase the available throughput to the end-user wireless devices being relayed. However, relay wireless devices may be limited in their ability to effectively service end-user wireless devices that are attached to it, particularly if the donor access node providing the service is unable to meet the needs of the relay wireless device, or if the relay wireless device is unable to determine a preferred donor access node from among a plurality of nearby access nodes.

OVERVIEW

Exemplary embodiments described herein include systems, methods, and nodes for donor selection for a relay access node. A method for donor selection in a relay access node includes identifying a plurality of donor access nodes, wherein the relay access node is within a radio range of each of the plurality of donor access nodes, prioritizing each of the plurality of donor access nodes based in part on a combination of a radio measurement of said each donor access node and a number of dedicated random access preambles provided by said each donor access node, and requesting a connection to a highest-prioritized donor access node.

A system for donor selection includes a relay access node configured to relay wireless services from a donor access node to one or more wireless devices, and a processor communicatively coupled to the relay access node. The processor configures the relay access node to execute operations including assigning a priority to each of a plurality of donor access nodes based in part on a radio measurement of a reference signal transmitted by said each donor access node, and adjusting the priority of said each donor access node based on one or both of a number of dedicated random access preambles provided by said each donor access node and a paging cycle of said each donor access node. The priority is adjusted higher for a donor access node having a higher number of dedicated random access preambles and a less frequent paging cycle.

A processing node for donor selection includes a processor for enabling the processing node to perform operations comprising selecting a subset of a plurality of donor access nodes based on a RSRP of a reference signal received from each of said plurality of donor access nodes, obtaining one or more of a number of dedicated random access preambles or a default paging cycle of each donor access node from the subset of the plurality of donor access nodes, and prioritizing said each donor access node from the subset based on a combination of the RSRP and said one or more of the number of dedicated random access preambles or the default paging cycle of each donor access node.

DETAILED DESCRIPTION

In embodiments disclosed herein, a relay wireless device is enabled to determine a preferred donor access node from among a plurality of donor access nodes that are within range of the relay wireless device. The relay wireless device measures radio characteristics of a plurality of access nodes that are nearby, or neighbor access nodes, and obtains additional radio resource control (RRC) information from each neighbor access node. The radio characteristics can include a reference signal receive power (RSRP) and/or a signal-to-interference noise radio (SINR) of a reference signal transmitted from each access node. The RRC information includes a number of dedicated random access preambles provided by the access node, and/or a default paging cycle for the access node. The RRC information may be retrieved from a system information message broadcast by each access node, such as a SIB2 message. The measurements and RRC information may be obtained periodically, at specific times, or averaged over a time period. For example, the measurement and characteristics of the neighbor access nodes and radio signals associated therewith may vary based on a time of day, and can therefore be periodically measured or retrieved and stored in a local database of the relay wireless device and averaged over a period of time. Consequently, the relay wireless device can refer to locally-stored characteristics when it determines a preferred access node, and can therefore account for changing conditions at each access node.

The neighbor access nodes are then prioritized based on the radio characteristics and the RRC information, and a connection is attempted to the access node having the highest priority, i.e. a preferred donor access node. The preferred donor access node is one that comprises one or more of the best signal measurement, high number of dedicated random access preambles, or a large paging cycle, i.e. infrequent pages. One or more thresholds may be defined as requirements for a preferred donor access node. During prioritization, the measurements and RRC information may be weighted differently, depending on which factor is more important to the relay access node, or to the network operator. Since the quality of the connection between the relay wireless device and a donor access node provides the backhaul for any wireless connection between the relay wireless device and end-user devices, the preferred donor access node is one that provides the highest and most reliable quality of service to the end-user wireless devices. These and additional operations are further described with respect to the embodiments depicted in FIGS. 1-5 below.

Figure 1:
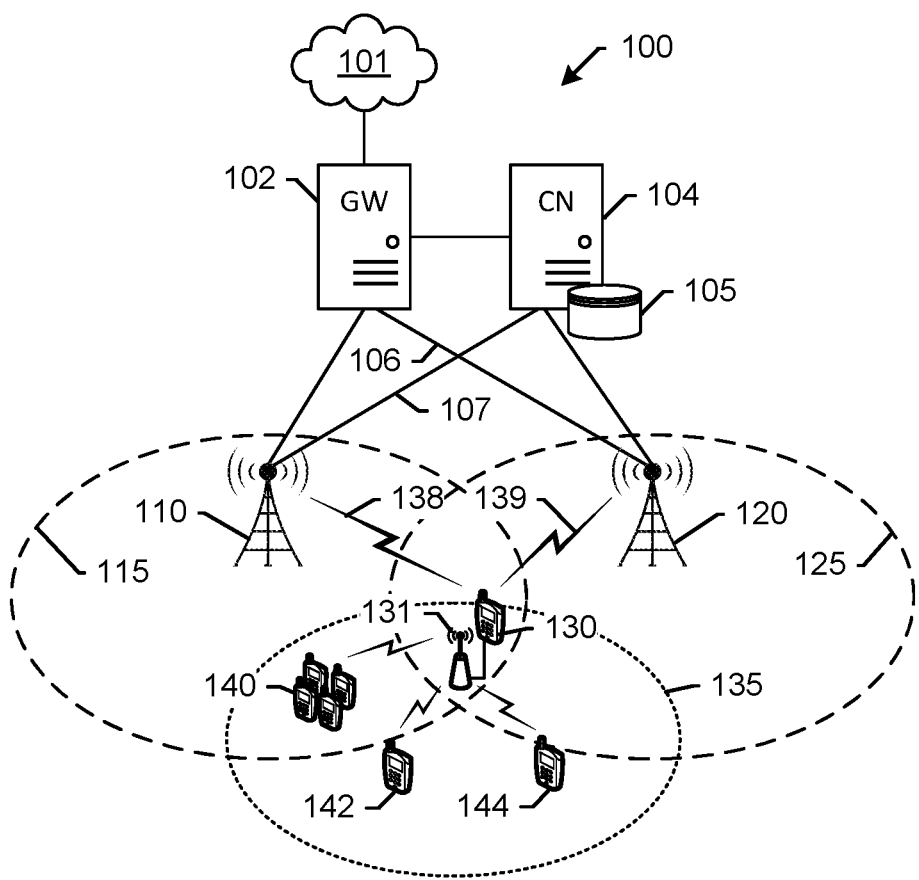
FIG. 1 depicts an exemplary system for donor selection.

FIG. 1 depicts an exemplary system 100 for donor selection. System 100 comprises a communication network 101, gateway 102, controller node 104, access nodes 110 and 120, relay wireless device 130, and end-user wireless devices 140, 142, and 144. In this embodiment, relay wireless device 130 relays services from one of access nodes 110, 120, to end-user wireless devices 140, 142, 144. To achieve this, relay wireless device 130 may be communicatively coupled to a mini-macro base station/access node 131. Mini-macro access node 131 acts as a wireless access point for wireless devices 140, 142, 144. Access node 110 is illustrated as having coverage area 115, and access node 120 is illustrated as having coverage area 125. Relay wireless device 130 is located within both coverage areas 115 and 120. Cluster of wireless devices 140 is located within coverage area 115, and wireless devices 142 and 144 are located outside either coverage area 115, 125, but within coverage area 135 of mini-macro access node 131. As a consequence, cluster of wireless devices 140 may access network services using the combination of relay wireless device 130 and mini-macro access node 131, rather than overload access node 110, which may be serving numerous other devices that are not shown. Moreover, wireless devices 142 and 144 that are outside ranges 115, 125 may access network services by virtue of being connected to relay wireless device 130 via mini-macro access node 131.

In operation, relay wireless device 130 is enabled to determine a preferred donor access node from among neighbor access nodes 110 and 120. Relay wireless device 130 measures radio characteristics of signals 138 and 139 transmitted respectively from access nodes 110 and 120. For example, signals 138 and 139 may be reference signals, and the radio characteristics can include a reference signal receive power (RSRP) and/or a signal-to-interference noise radio (SINR) of each reference signal 138, 139. Further, signals 138 and 139 can include broadcasts of system information related to each neighbor access node. For example, the system information message may be a SIB2 message broadcast by each access node 110, 120. Consequently, relay wireless device 130 can obtain additional radio resource control (RRC) information of each access node 110, 120 from these messages. The RRC information includes a number of dedicated random access preambles provided by each neighbor access node 110, 120, and/or a default paging cycle for each neighbor access node.

The neighbor access nodes 110, 120 are then prioritized by relay wireless device 130 based on the radio characteristics and the RRC information, and a connection is attempted to the access node having the highest priority, i.e. a preferred donor access node. The preferred donor access node is one that has the best combination of signal measurement, high number of dedicated random access preambles, and a large paging cycle. More dedicated random access preambles generally result in fewer collisions, thereby reducing latency for end-user wireless devices 140, 142, 144, particularly if the preambles are dedicated towards relay usage. Larger paging cycles result in less frequent pages, thereby ensuring increased throughput for data versus paging operations. Increased throughput is generally preferred for relay wireless devices as they serve numerous end-users.

Moreover, during prioritization, the measurements and RRC information may be weighted differently, depending on which factor is more important. For example, the radio characteristic measurement, i.e. RSRP, SINR, etc., may be assigned a higher weight than the number of dedicated random access preambles or the default paging cycle of each donor access node 110, 120. In an embodiment, for instance, the access nodes 110, 120, may be prioritized first based on a radio signal measurement, and then the priorities refined based on the RRC information. Additionally, a higher priority may be assigned to a donor access node having a default paging cycle with a lower frequency (i.e. larger cycle) than a donor access node with a smaller cycle, if both first and second donor access nodes have approximately equal radio measurements and numbers of dedicated random access preambles. In other words, a higher weight is assigned to the number of dedicated random access preambles than to the default paging cycle. In some embodiments, the opposite may be true. That is, a higher weight is assigned to the default paging cycle than to the number of dedicated random access preambles. In some embodiments, an RSRP/SINR is approximately equal for two access nodes if they are within 5% of each other, upon which the RRC information is used to refine the priority of each access node.

Additional characteristics of each neighbor access node 110, 120 may be used in a determination of the preferred donor access node. For example, these characteristics can comprise a comparison of the loading and throughput information for each access node with a requirement of relay wireless device 130 and the end-user wireless devices 140, 142, 144 connected thereto, a backhaul connection reliability based on a block error rate (BER) or packet error rate (PER) of each access node, a retransmission rate for the access node or for devices connected to the access node (including relay wireless device 130 itself), resource availability for the access node, a frequency band class deployed by the access node, or any other feature that can alter the transmission characteristics of links 138, 139 between the access node and wireless devices attached thereto. Such characteristics may be measured by relay wireless device 130 or by the access node and reported or broadcast to relay wireless device 130, and may be based on an uplink or downlink reference signal, or any combination thereof. For instance, errors and retransmissions of uplink packets can be measured at relay wireless device 130, while errors and retransmissions of downlink packets are measured at one or both of access nodes 110, 120, and transmitted to relay wireless device 130.

The measurements, RRC information, and other characteristics may be obtained periodically, at specific times, or averaged over a time period. For example, the measurement and characteristics of each neighbor access node 110, 120, and radio signals 138, 139 associated therewith, may vary based on a time of day, and can therefore be periodically measured or retrieved and stored in a local database of relay wireless device 130 and averaged over a period of time. Consequently, relay wireless device 130 can refer to locally-stored characteristics when it determines a preferred access node, and can therefore account for changing conditions at each access node 110, 120. In some embodiments, characteristics may be stored in database 105 coupled to controller node 104, with relay wireless device 130 requesting this information from controller node 104 to use in making a determination of a preferred donor access node.

One or more thresholds may be defined as requirements for a preferred donor access node. For example, determination of a preferred access node may be based on a comparison of a plurality of characteristics of each candidate donor access node 110, 120 with a number of thresholds for reliable and efficient provision of services to end-user wireless devices 140, 142, 144 via relay wireless device 130. For example, the information about access nodes 110, 120, and signals 138, 139 thereof, may be correlated with a requirement of relay wireless device 130 and the end-user wireless devices 140, 142, 144 connected thereto. The requirements may be used to set the thresholds that are compared against the characteristics. The requirements may include, for instance, a specified bandwidth for a time period, or a minimum SINR level at a time of day, an ability to provide carrier-aggregation services, a minimum number of dedicated random access preambles, or any other features that can increase the quality of service (QoS) or reliability of the connection with relay wireless device 130. For example, a minimum of between 5 and 10 random access preambles may be dedicated, versus 64 total preambles available from the carrier or access node. The random access preambles may be dedicated to relay usage, i.e. for communications with relay wireless device 130, or may be dedicated to end-user wireless devices attached thereto and communications thereof, such as emergency communications, or other high-priority communications/devices. In some embodiments, resource block utilization may be used to determine the load or throughput of each access node 110, 120. In some embodiments, the preferred donor access node is one that can provide relay wireless device 130 with preferential treatment because it is functioning as a relay. Examples of preferential treatment can include, but are not limited to, increasing a scheduling weight for relay wireless device 130, setting one or more network parameters in order to give traffic associated with relay wireless device 130 better network performance than traffic associated with non-relaying devices, and so on. Network parameters may be configured to provide one or more of higher priority in scheduling resources, improved RF conditions, higher throughput, lower latency, etc. to relay wireless device 130 than are provided to other non-relaying wireless devices, such as end-user wireless devices that directly connect to access nodes 110, 120.

Further, any access node that meets the threshold requirements from among access nodes 110, 120 (and other access nodes that are not shown) is added to a list of candidate donor access nodes. The candidate donor access node that best meets the thresholds may be selected as the preferred donor access node, and a connection request submitted to the preferred donor access node. Since the quality of the connection between the relay wireless device and a donor access node provides the backhaul for any wireless connection between the relay wireless device and end-user devices, the preferred donor access node is one that provides the highest and most reliable quality of service to end-user wireless devices 140, 142, 144. Relay wireless device 130 may attempt to connect to a preferred access node, such as access node 110, by requesting to send a buffer status report to access node 110. Access node 110 can grant this request in a conventional manner. Relay wireless device 130 may respond to the grant by sending a short buffer status report. This short buffer status report is associated with a logical channel group that indicates the buffer status report is communicating the status of wireless device 130 as a relay, and thus is not asking for additional resource allocations (like a 'conventional' buffer status report would indicate). In other words, access node 110 is configured such that when a wireless device responds with a buffer status report for the 'special' logical channel group, it means that the buffer status report is not actually reporting the status of a buffer. Rather, this buffer status report indicates that wireless device 130 is now functioning as a relay.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay wireless device 130 to one or more of wireless devices 140, 142, 144. Likewise, RF signals received from wireless devices 140, 142, 144 are amplified and transmitted by relay wireless device 130 to a donor access node 110, 120. Alternatively or in addition, a layer 2 relay device performs a decode and forward (DF) function. RF signals received from donor access node 110 are demodulated and decoded, then encoded and modulated again before being transmitted by relay wireless device 130 to one or more of wireless devices 140, 142, 144. Likewise, RF signals received from one or more of wireless devices 140, 142, 144 are demodulated and decoded, then encoded and modulated again before being transmitted by relay wireless device 130 to donor access node 110. Alternatively or in addition, a layer 3 relay device also performs a decode and forward function. However, a layer 3 relay device also performs additional processing (such as ciphering and/or data concatenation/segmentation/resassembly) In other words, relay wireless device 130 performs demodulation and decoding of the received RF signals (either uplink or downlink), processes received data, then encodes, modulates, and transmits the data to one or more of wireless devices 140, 142, 144.

Wireless devices 130, 140, 142, 144 may be any device, system, combination of devices, or other such communication platform capable of communicating wirelessly with access nodes 110, 120 using one or more frequency bands deployed by access nodes 110, 120. Wireless devices 130, 140, 142, 144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 108, 109 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 can be any network node configured to provide communication between wireless devices 130, 140, 142, 144, and communication network 101. Access nodes 110, 120 can be standard access nodes and/or short range, low power, small access nodes. A standard access node can be a macrocell access node such as a base transceiver station, a radio base station, an eNodeB device, or an enhanced eNodeB device, or the like. In an exemplary embodiment, a macrocell access node can have a coverage area 115, 125 in the range of approximately five kilometers to thirty five kilometers and an output power in the tens of watts. A small access node can include a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise a processor and associated circuitry to execute or direct the execution of computer-readable instructions to obtain information. Access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 120 can receive instructions and other input at a user interface. Access nodes 110, 120 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101

Figure 2:
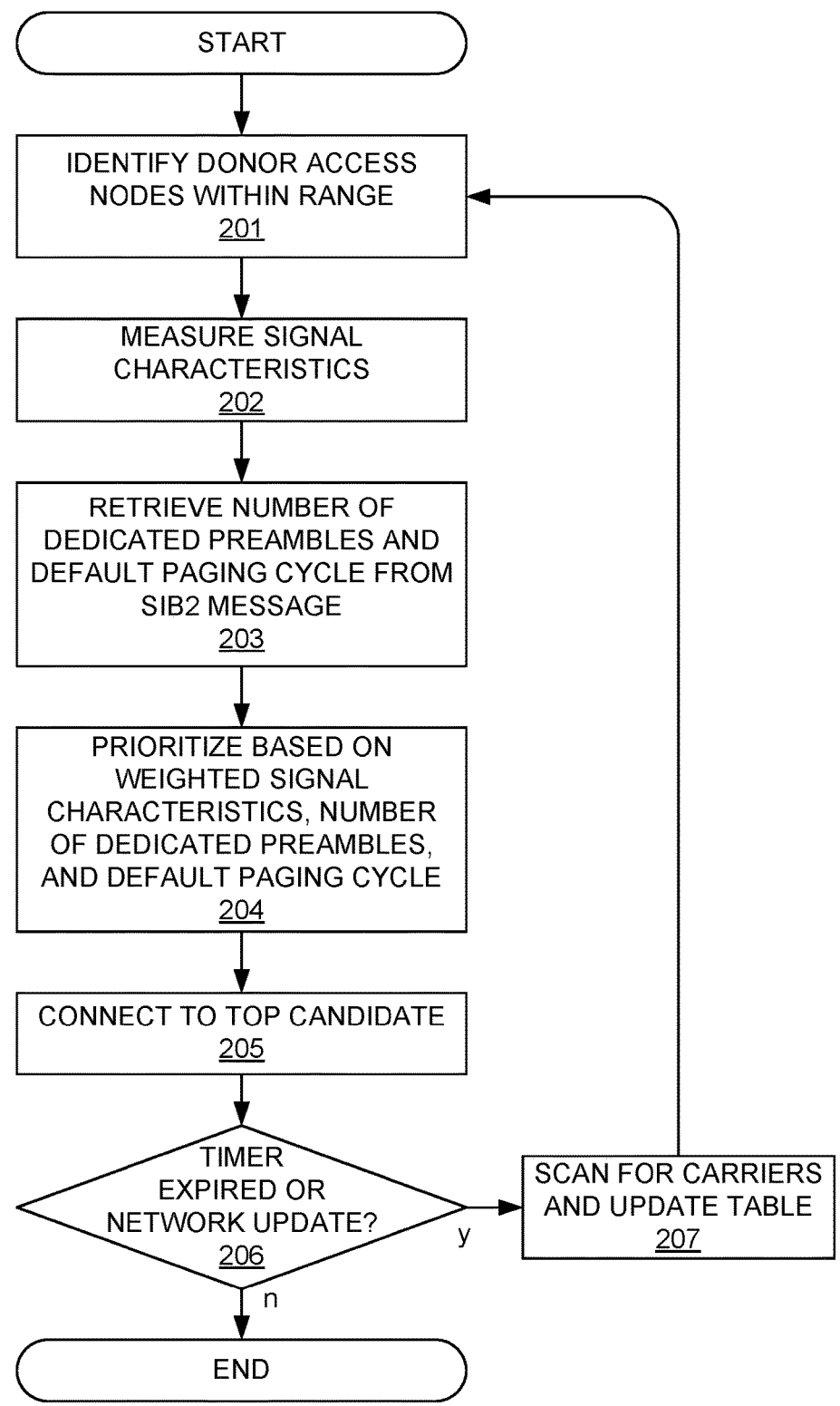
FIG. 2 depicts an exemplary method for donor selection.

FIG. 2 depicts an exemplary method for donor selection. The method is generally discussed with reference to elements within system 100. For example, the method comprises operations that may be performed by relay wireless device 130. In other embodiments, the method can be implemented with any suitable network element. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 201, one or more donor access nodes are identified. The donor access nodes may include neighbor access nodes that are identified based on reception of reference signals broadcast from each neighbor access node and received at the relay wireless device. The donor access nodes may further be identified based on a search for carriers conducted in step 207, or from a table of known neighbor access nodes stored on the relay wireless device. For instance, the table may contain the last known donor access nodes, and is referenced to determine which of the last known donor access nodes are within range, based on reference signals broadcast therefrom.

In either case, at 202, radio characteristics of reference signals transmitted from each neighbor access node are measured. For example, the radio characteristics can include a reference signal receive power (RSRP) and/or a signal-to-interference noise radio (SINR). The measurements may be triggered by the relay wireless device as part of a preferred donor access node determination. Further, in 203, additional characteristics of each access node are retrieved from a broadcast of system information related to each access node. For example, the system information message may be a SIB2 message broadcast by each access node, which contains additional radio resource control (RRC) information of each access node, such as a number of dedicated random access preambles provided by each access node, and a default paging cycle for each neighbor access node. The default paging cycle may be retrieved from a PCCH-Config portion of a SIB2 message. The PCCH-Config portion contains the default paging cycle and an nB parameter defining a frequency of pages, or a paging occasion. Thus, the default paging cycle defines a paging frame and paging occasion that wake up a wireless device from an idle state for data transfer. Additional characteristics of each neighbor access node may also be retrieved in steps 202 and 203. These characteristics can include, for instance, a loading and throughput information for each access node, a backhaul connection reliability based on a block error rate (BER) or packet error rate (PER), a retransmission rate for the access node or for devices connected thereto, a resource availability for the access node, a frequency band class deployed by the access node, or any other characteristic that can be measured by the relay wireless device or by the access node and reported or broadcast to the relay wireless device via an uplink or downlink reference signal or any combination thereof.

In step 204, the neighbor access nodes are prioritized based on the radio characteristics and the RRC information, and a connection is attempted to the access node having the highest priority, i.e. a preferred donor access node. The preferred donor access node is one that has the best combination of signal measurement, high number of dedicated random access preambles, and a large paging cycle. More dedicated random access preambles generally result in fewer collisions, thereby reducing latency for end-user wireless devices, particularly if the preambles are dedicated towards relay usage. Larger paging cycles result in less frequent pages, thereby ensuring increased throughput for data versus paging operations. Increased throughput is generally preferred for relay wireless devices as they serve numerous end-users. Moreover, larger (or less frequent pages) result in less power consumption for wireless devices that have to return from an idle state in order to receive the pages.

The prioritization may be performed using weighted signal measurements and characteristics. In other words, the measurements and RRC information may be weighted differently, depending on which factor is more important. For example, in some embodiments, the candidates may be arranged in 204 based primarily on one characteristic, and refined using a secondary characteristic. For instance, the relay wireless device may prioritize the RSRP and SINR of the reference signal, and may refine the selection using a secondary characteristic such as number of dedicated random access preambles or a default paging cycle. Thus, the radio characteristic measurement, i.e. RSRP, SINR, etc., may be assigned a higher weight than the number of dedicated random access preambles or the default paging cycle of each donor access node. Additionally, a higher priority may be assigned to a donor access node having a default paging cycle with a lower frequency (i.e. larger cycle) than a donor access node with a smaller cycle, if both first and second donor access nodes have approximately equal radio measurements and numbers of dedicated random access preambles. In other words, a higher weight is assigned to the number of dedicated random access preambles than to the default paging cycle. In some embodiments, the opposite may be true. That is, a higher weight is assigned to the default paging cycle than to the number of dedicated random access preambles.

At 205, the donor access node that is highest-prioritized is selected as the preferred donor access node, and a connection request submitted to the preferred donor access node. The relay wireless device may attempt to connect to the preferred access node by indicating its relay status to the access node, for instance by requesting to send a buffer status report to the access node, or by any other means evident to those having ordinary skill in the art in light of this disclosure.

In 206, a decision is made as to whether or not an updated scan is required to determine a new preferred donor access node, or to populate a list of donor access nodes within range. As described herein, the measurements, RRC information, and other characteristics may be obtained periodically, at specific times, or triggered by an event, such as a network update. For instance, a timer may be set to indicate a period upon which a scan 207 of deployed carriers is made, and the locally stored table updated. The network update can include, for instance, addition of a new donor access node, or removal of an existing donor access node. The network update can also include a change in the carrier deployment of an access node. As the system information messages (i.e. SIB2) are unique for each carrier, each message contains preamble and paging information unique to the carrier deployed by the access node. Consequently, decision 206 is based on such a trigger. If the timer is not expired or if there is no network update, the method may end, or loop around decision 206. If the timer expires or a network update is determined, a scan is performed in 207 for carriers nearby, and a table is updated. For example, the measurement and characteristics of each neighbor access node and radio signals associated therewith may vary based on a time of day, and can therefore be periodically measured or retrieved and stored in a local database and averaged over a period of time. A relay wireless device can refer to locally-stored characteristics when it identifies donor access nodes in step 201, and the method is repeated.

Figure 3:
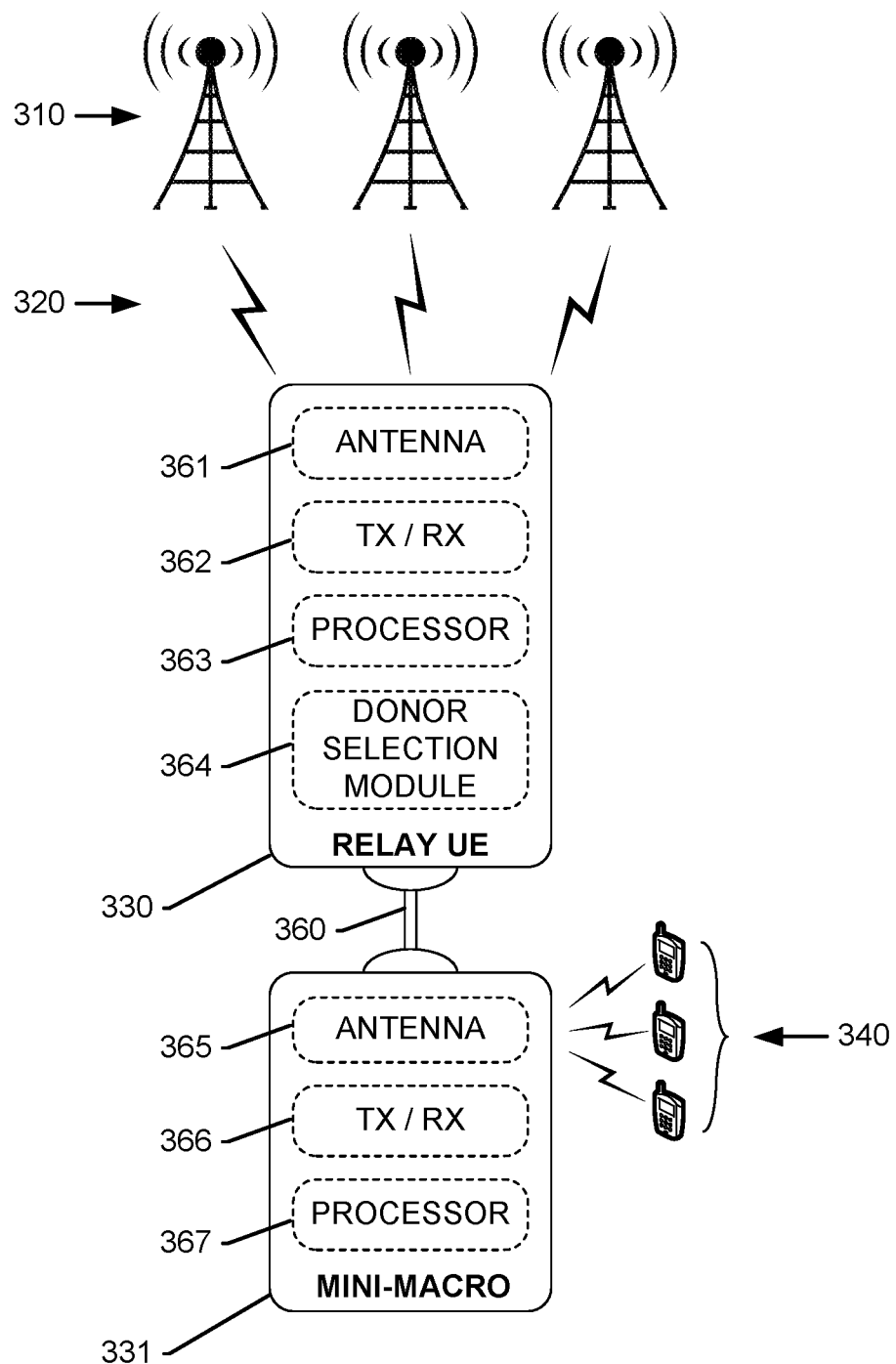
FIG. 3 depicts an exemplary relay wireless device coupled to a mini-macro access node.

FIG. 3 depicts an exemplary relay wireless device 330 coupled to a mini-macro access node 331. Relay wireless device 330 is illustrated as comprising an antenna 361 for direct (i.e. unrelayed) communication with one or more of access nodes 310 via communication links 320, a transceiver 362, a processor 363, and a donor selection module 364 for enabling relay wireless device 330 to perform donor selection operations described herein, for example with reference to FIG. 2. Further, relay wireless device 330 is coupled to mini-macro base station or access point 331 via a communication interface 360. Communication interface 360 may be any interface that enables direct communication between relay wireless device 330 and mini-macro 331, such as USB, FireWire, or any other serial, parallel, analog, or digital interface. Mini-macro access node 331 is illustrated as comprising an antenna 365 for wireless communication with end wireless devices 340, a transceiver 366, and a processor 367. Although only one transceiver is depicted in each of relay wireless device 330 and mini-macro access node 331, additional transceivers may be incorporated in order to facilitate communication across interface 360 and other network elements.

Figure 4:
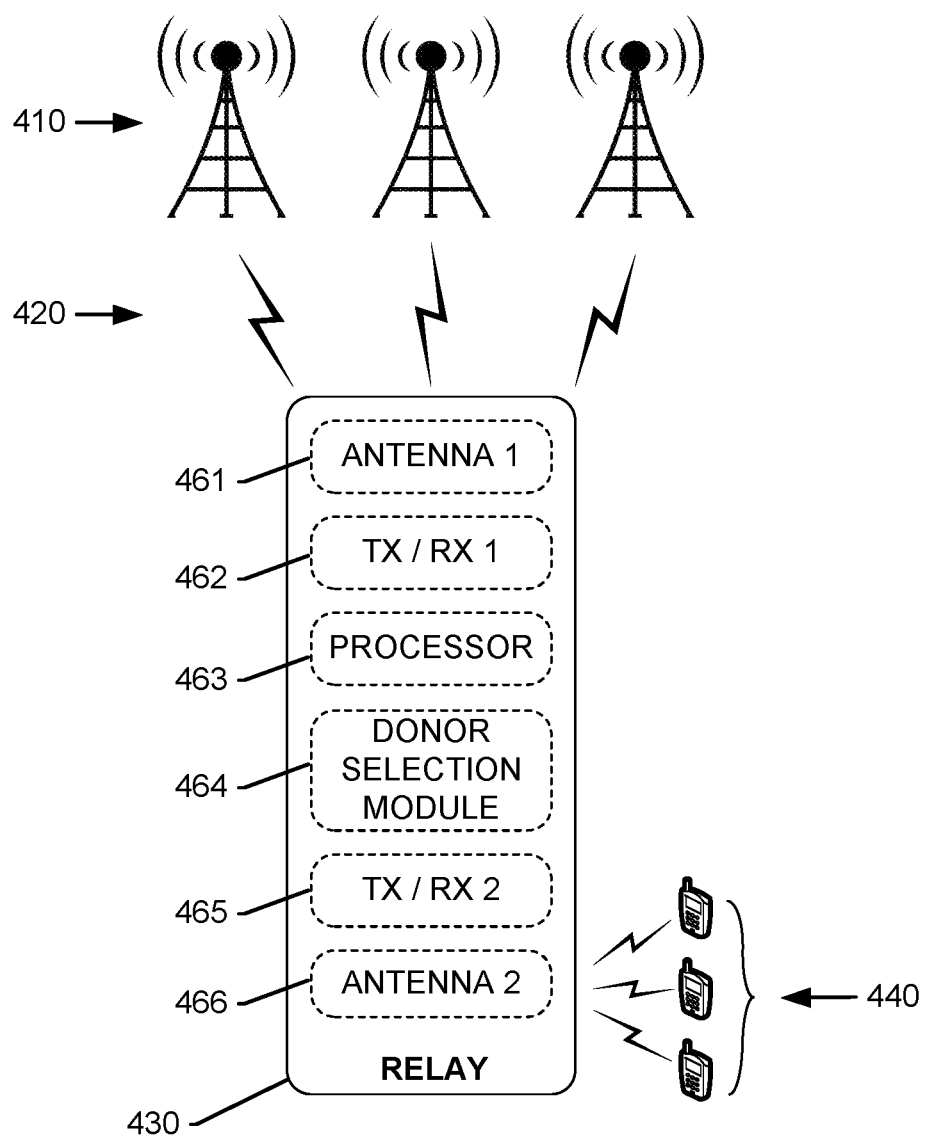
FIG. 4 depicts an exemplary relay access node combining a relay wireless device and a mini-macro access node.

FIG. 4 depicts an exemplary relay access node 430. Relay access node is a combination of the relay wireless device 330 and mini-macro 331 depicted in FIG. 3. However, the separate-but-connected combination of relay wireless device 330 and mini-macro 331 may also be referred to as a relay access node. In this case, relay access node 430 is illustrated as comprising a first antenna 461 for direct communication with one or more of access nodes 410 via communication links 420, a first transceiver 462, a processor 463, a donor selection module 464 for enabling relay access node 430 to perform donor selection operations described herein (for example with reference to FIG. 2), a second transceiver 465, and a second antenna 466 for wireless communication with end wireless devices 440. Although only two transceivers are depicted in relay access node 430, additional transceivers may be incorporated in order to facilitate communication with other network elements. Moreover, the term "relay access node" may be used to refer to both configurations shown in FIGS. 3 and 4, and other combinations conceivable to those having ordinary skill in the art at upon reading this disclosure.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, wireless devices 130, 140, 142, 144, and/or network 101.

Figure 5:
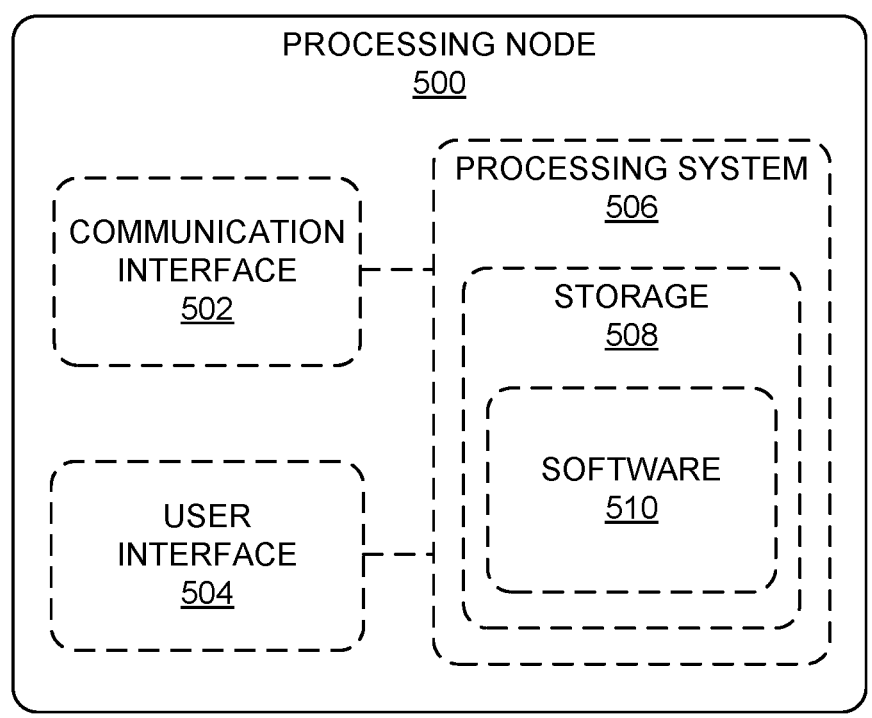
FIG. 5 depicts an exemplary processing node.

FIG. 5 depicts an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a module for determining a preferred donor access node, as described herein. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for donor selection in a relay access node in a wireless network, the method comprising:
   identifying a plurality of donor access nodes, wherein the relay access node is within a radio range of each of the plurality of donor access nodes;
   assigning a priority to each of the plurality of donor access nodes based in part on a radio measurement of a reference signal transmitted by said each donor access node;
   adjusting the priority of said each donor access node based on one or both of a number of dedicated random access preambles provided by said each donor access node and a paging cycle of said each donor access node, the adjusting further comprising assigning a higher priority to a donor access node that has a higher number of dedicated random access preambles and a less frequent paging cycle; and
   transmitting a connection request to a highest-prioritized donor access node.

2. The method of claim 1, wherein identifying the plurality of donor access nodes on a periodic basis comprises scanning for one or more carriers deployed by said each of the plurality of donor access nodes.

3. The method of claim 2, further comprising scanning for the one or more carriers on a periodic basis.

4. The method of claim 3, wherein the periodic basis comprises a low-traffic period.

5. The method of claim 2, wherein scanning for the one or more carriers is triggered by one or more of a donor access node being introduced into the wireless network, or a donor access node being removed from the wireless network.

6. The method of claim 5, further comprising storing a list of identified donor access nodes and deployed carriers on the relay access node.

7. The method of claim 6, wherein the radio measurement is any combination of a reference signal receive power (RSRP) or a signal-to-interference noise radio (SINR).

8. The method of claim 1, further comprising determining a plurality of candidate donor access nodes from the plurality of donor access nodes based on the radio measurement from each of said plurality of donor access nodes exceeding a threshold.

9. The method of claim 1, further comprising retrieving the number of dedicated random access preambles for each donor access node from a system information block message transmitted from said each donor access node.

10. The method of claim 9, further comprising assigning a higher priority to a first donor access node having a higher number of dedicated random access preambles than a second donor access node when both first and second donor access nodes have approximately the same radio measurements.

11. The method of claim 9, further comprising retrieving a default paging cycle for said each donor access node from said system information block message, and adjusting a priority of said each donor access node based on the default paging cycle.

12. A system for donor selection, the system comprising:
a relay wireless device configured to relay wireless services from a donor access node to one or more end-user wireless devices; and
a processor communicatively coupled to the relay wireless device, the processor for configuring the relay wireless device to execute operations comprising:
assigning a priority to each of a plurality of donor access nodes based in part on a radio measurement of a reference signal transmitted by said each donor access node;
adjusting the priority of said each donor access node based on one or both of a number of dedicated random access preambles provided by said each donor access node and a paging cycle of said each donor access node;
wherein the priority is adjusted higher for a donor access node having a higher number of dedicated random access preambles and a less frequent paging cycle; and
transmitting a connection request to a highest-prioritized donor access node.

13. The system of claim 12, wherein the operations further comprise retrieving the number of dedicated random access preambles and the paging cycle for a first donor access node from a system information message transmitted from the first donor access node.

14. The system of claim 13, wherein the system information message comprises a System Information Block (SIB2) message.

15. The system of claim 14, wherein the SIB2 message is associated with one carrier out of a plurality of carriers deployed by the first donor access node.

16. A processing node for donor selection, the processing node comprising a processor for enabling the processing node to perform operations comprising:
prioritizing a plurality of donor access nodes based on a RSRP of a reference signal received from each of said plurality of donor access nodes;
obtaining one or more of a number of dedicated random access preambles or a default paging cycle of each donor access node from the plurality of donor access nodes;
adjusting a priority of said each donor access node based on one or more of the number of dedicated random access preambles or the default paging cycle of each donor access node, wherein the adjusting further comprising assigning a higher priority to a donor access node that has a higher number of dedicated random access preambles and a less frequent default paging cycle; and
transmitting a connection request to a highest-prioritized donor access node.

17. The processing node of claim 16, wherein the prioritizing further comprises assigning the radio measurement a higher weight than said one or more of the number of dedicated random access preambles or the default paging cycle of said each donor access node.

18. The processing node of claim 17, wherein the prioritizing further comprises assigning a higher priority to a first donor access node having a default paging cycle with a lower frequency than a second donor access node when both first and second donor access nodes have approximately equal radio measurements and numbers of dedicated random access preambles.

19. The processing node of claim 17, wherein the prioritizing further comprises assigning a higher weight to the number of dedicated random access preambles than to the default paging cycle.

* * * * *